Nov. 7, 1967 A. S. HARRISON 3,351,273
HONEY EXTRACTING APPARATUS
Filed May 3, 1965 3 Sheets-Sheet 1
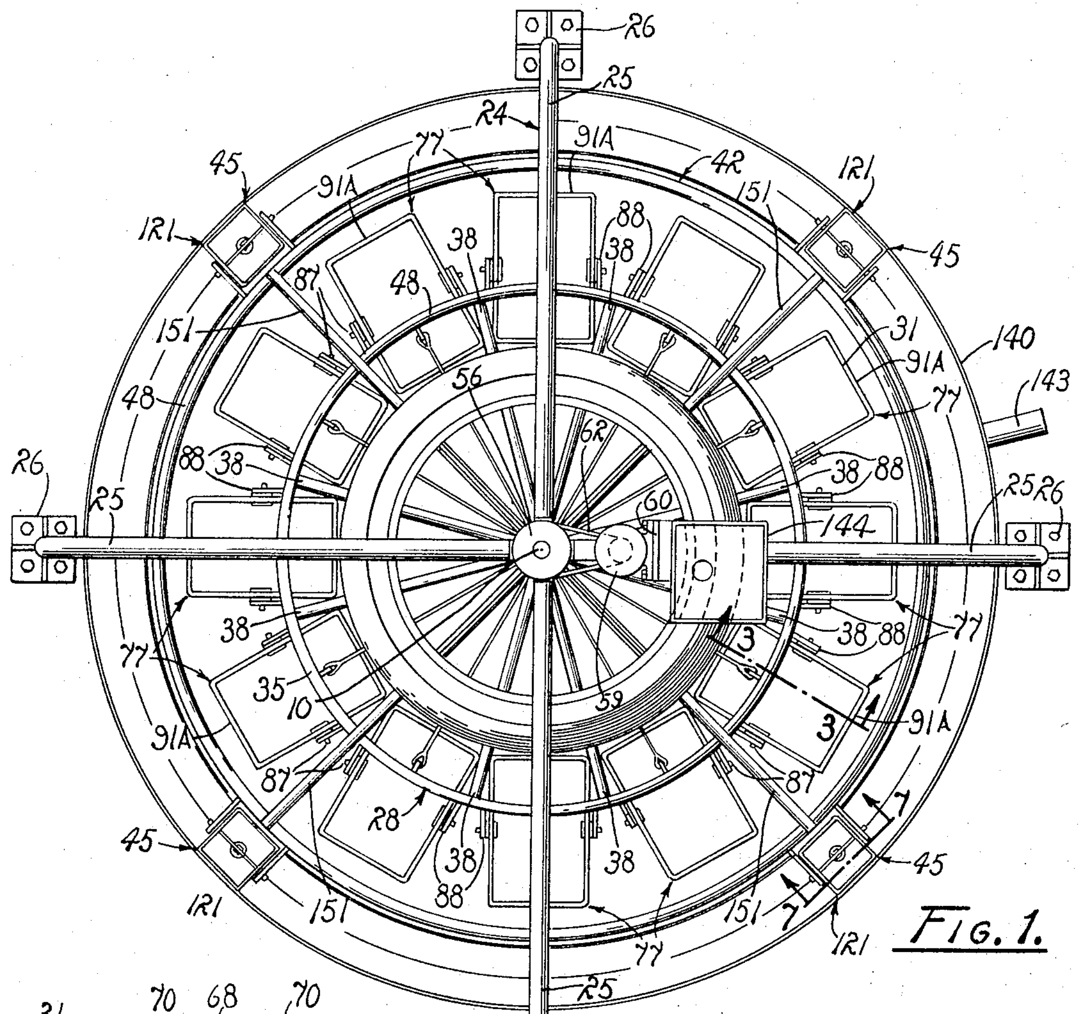
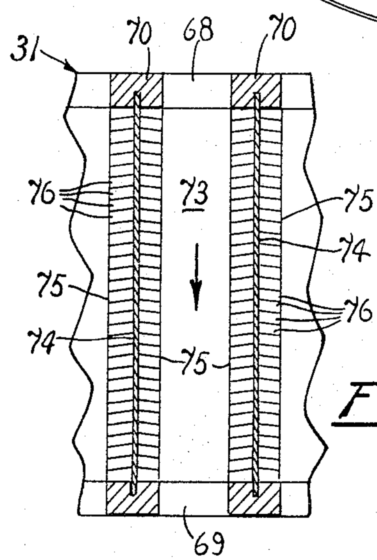
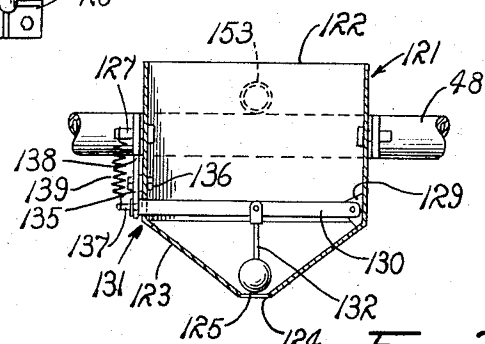
ARTHUR HARRISON
INVENTOR
Huebner & Worrel
ATTORNEYS

HONEY EXTRACTING APPARATUS

Filed May 3, 1965 3 Sheets-Sheet 2

ARTHUR HARRISON
INVENTOR

Huebner + Worrel
ATTORNEYS

HONEY EXTRACTING APPARATUS
Filed May 3, 1965 3 Sheets-Sheet 3
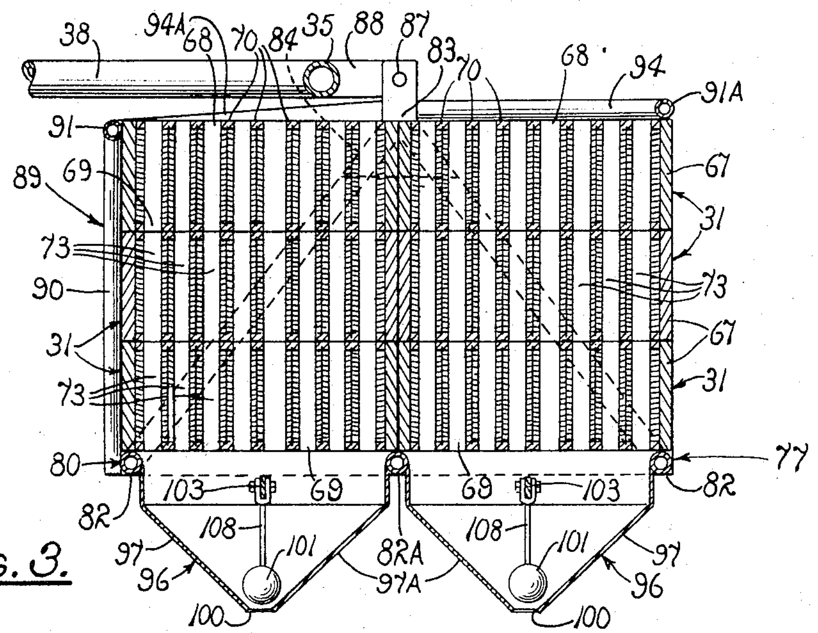
FIG. 3.
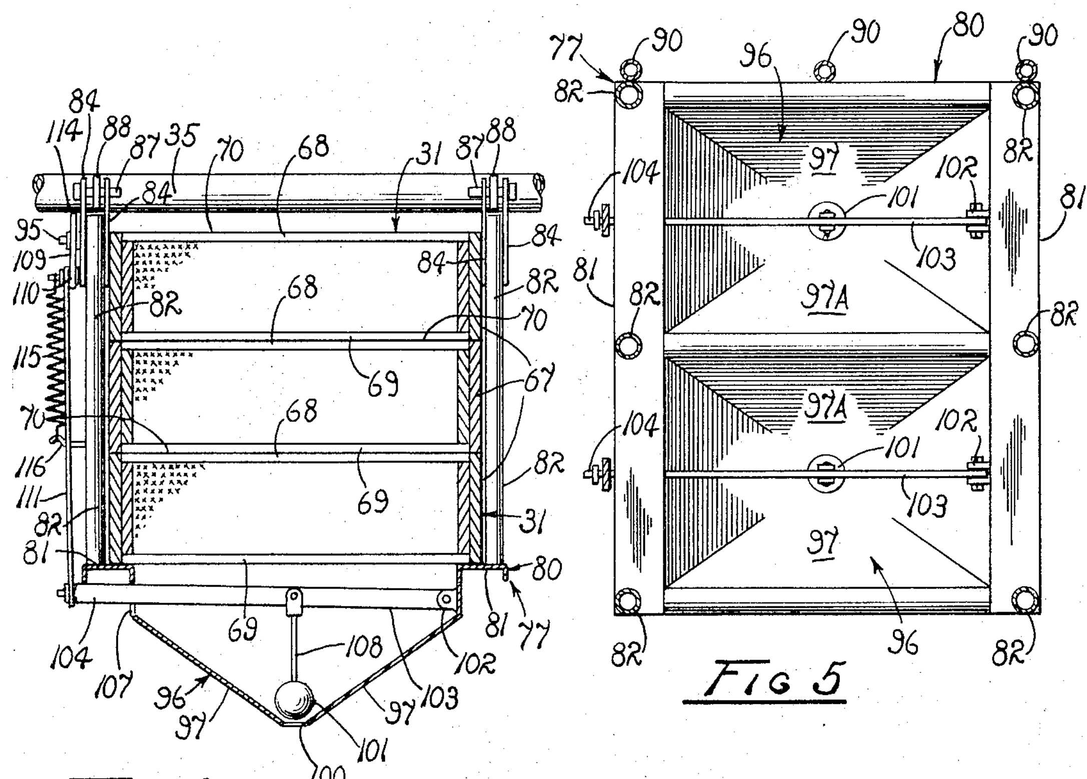
FIG. 4.
FIG 5
ARTHUR HARRISON
INVENTOR
Huebner & Worrel
ATTORNEYS United States Patent Office 3,351,273 Patented Nov. 7, 1967

3,351,273
HONEY EXTRACTING APPARATUS

Arthur S. Harrison, P.O. Box 602
Los Banos, Calif. 93635

Filed May 3, 1965, Ser. No. 452,782
5 Claims. (Cl. 233—20)

The present invention relates to a honey extracting apparatus and more particularly to such an apparatus which subjects respective quantities of uncapped honey-impregnated honeycombs and honeycomb cappings to centrifugal forces so that the honey is effectively and efficiently separated from the honeycombs and cappings, and which collects the separated honey for subsequent use, as desired.

The present invention is a companion development to the invention described in my prior copending patent application filed Nov. 2, 1964, Ser. No. 408,005, entitled Machine for Uncapping Honeycombs. This prior invention allows for the first time the use of honey extraction supers having permanently attached honeycomb frames, by effecting the simultaneous removal of the cappings from all honeycombs therein. This advance was made possible by the development of a plastic foundation which neither warps nor melts under the extreme temperature conditions frequently encountered in honey production. After uncapping, however, it is then necessary to remove the honey from the uncapped honeycombs and, for most efficient honey production, to separate the honey from the cappings, which have become somewhat mulched in the uncapping and capping removal process. The apparatus, or centrifuge, of the present invention fulfills this need.

Since previously to the above prior invention, the uncapping of the honey-impregnated honeycombs seated in the frames had not been attempted while the frames were still mounted in the super, the problems involved in simultaneous evacuation of honey from all the honeycombs in a super are not widely known. However, in order to utilize centrifugal forces for this purpose a suitable apparatus should provide a means of conveniently and firmly securing as many supers as practical on a support member adapted to rotate at high velocity. The supers should be disposed so as to allow free centrifugal discharge of honey therefrom and the centrifuge should be so constructed as to allow convenient collection of honey. Any valves which are necessary to control the flow of the honey must be operable and controllable during rotation in order to avoid indiscriminate discharge of honey as it is subjected to centrifugal forces. All of the above features must be embodied in a structure capable of withstanding the appreciable stresses resulting from high-velocity rotation.

Although it has been known to extract honey from honeycombs by centrifuging the individual frames, this has been accomplished through use of a stationary receiving wall onto which the centrifuged honey is thrown or drawn across. As a result, the honey becomes extremely attenuated, forming fine threads which cause incorporation of a substantial amount of air in the collected honey and results in great difficulty and inconvenience in handling the collected honey. This result is aggravated in the case of cappings, which already contain an appreciable quantity of air even before separation of the honey.

Therefore, it is an object of the present invention to provide an improved honey extracting apparatus.

Another object is to provide such an apparatus which subjects respective quantities of uncapped honey-impregnated honeycombs and honeycomb cappings to centrifugal forces many times the force of gravity.

Another object is to provide such an apparatus which effectively separates the honey from the honeycombs and cappings and which collects the separated honey without waste and with a minimum of air incorporation in the honey.

Another object is to provide such an apparatus to which honey extraction supers having permanent frames may be conveniently and efficiently secured for centrifuging and thereafter conveniently released upon removal of the honey.

Another object is to provide such an apparatus which prevents waste of honey.

Another object is to provide such an apparatus which allows the loading thereon of honey-impregnated mulched cappings or other honeycomb fragments during rotation of the centrifuge.

Another object is to provide such an apparatus which allows the use of honey-evacuated supers for subsequent honey production.

Another object is to provide such an apparatus on which the supers and cappings may be disposed for centrifuging to allow the free, unobstructed flow of honey from said supers and cappings without the forming of thin filaments or fine threads by the honey, and thus to minimize incorporation of air in the collected honey.

Another object is to provide such an apparatus in which any valves utilized to control honey collection are adapted to be operated during and after centrifuging so as to control the flow of honey without waste.

Another object is to provide such an apparatus having a structure capable of withstanding extreme centrifugal stresses caused by high-velocity rotation.

Another object is to provide such an apparatus in which all portions thereof are conveniently accessible for cleaning and maintenance.

Another object is to provide such an apparatus having a simple structure capable of economical operation.

These and other objects and advantages will become more fully apparent upon reference to the following description and the accompanying drawings:

In the drawings:

FIG. 1 is a plan view of a honey extracting apparatus embodying the principles of the present invention.

FIG. 3 is a further enlarged longitudinal section of the super-support cage of FIG. 2 taken in a plane represented by line 3—3 in FIG. 1 and showing a plurality of supers mounted thereon.

FIG. 4 is a further enlarged transverse vertical section of the super-support cage of FIG. 2 taken in a plane represented by line 4—4.

FIG. 5 is a further enlarged horizontal section of the super-support cage of FIG. 2 taken in a plane represented by line 5—5.

FIG. 6 is a still further enlarged fragmentary section of a honey-extraction super of FIG. 3, showing the sloping orientation of the individual honeycomb cells.

FIG. 7 is a further enlarged transverse section of the separation container of FIG. 2, taken in a plane represented by line 7—7 in FIG. 1.

Figure 2:
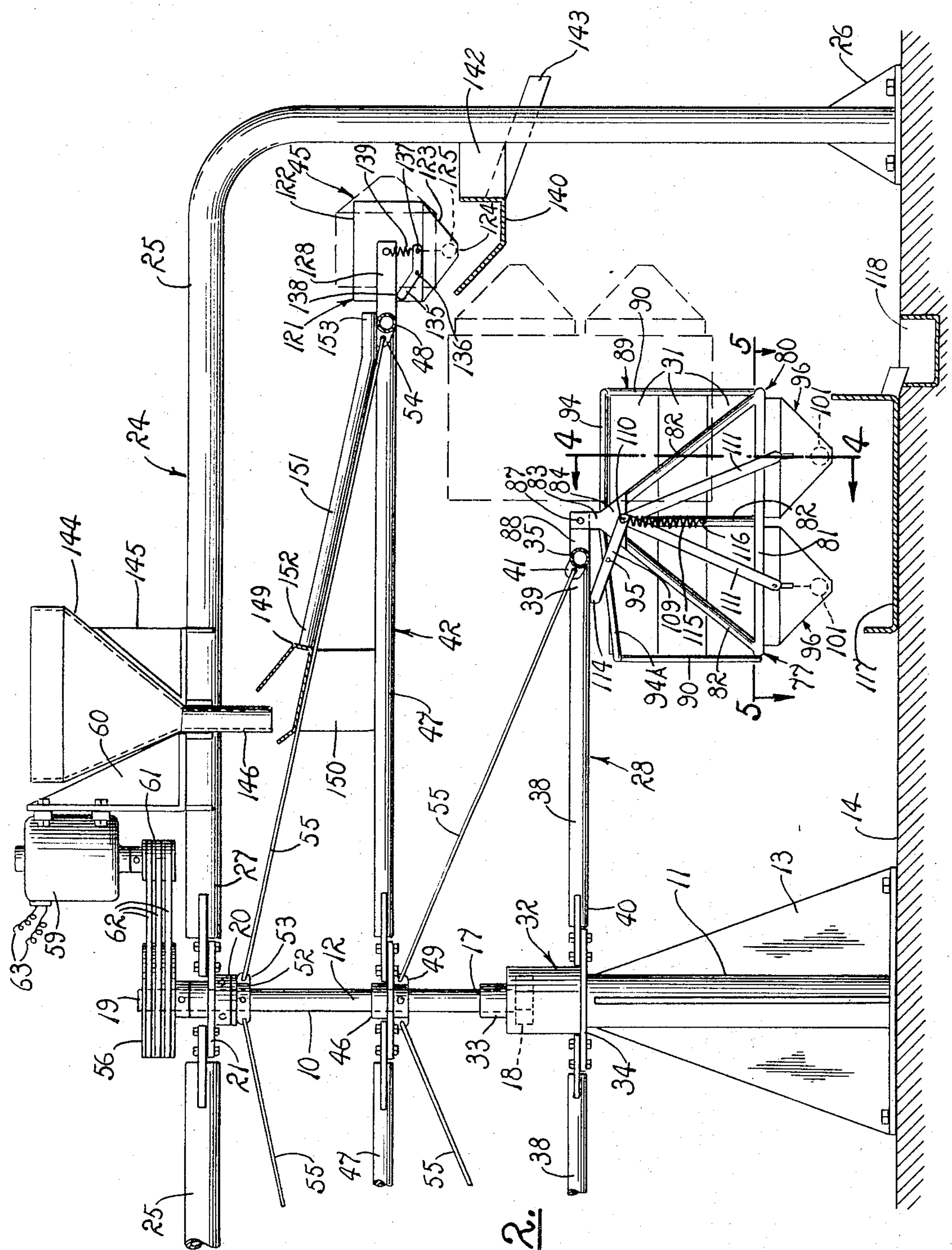
FIG. 2 is a somewhat enlarged fragmentary side elevation of the apparatus of FIG. 1, showing a super-support cage and a separation container in respective positions of rest and rotation.

Referring more particularly to the drawings, the honey extracting apparatus or centrifuge of the present invention includes an elongated shaft 10 mounted on a pedestal 11 for rotation about a substantially vertical axis 12. Reinforcing flanges 13 give the pedestal additional strength to resist buckling and over-turning. The pedestal is secured to a suitable foundation 14, preferably concrete, by means of bolts or the like.

The lower end 17 of the shaft 10 is seated in journaled engagement in a suitable end-thrust bearing 18 which is preferably bolted to the top of the pedestal 11 in cupped relation therewith. The upper end 19 of the shaft is supported in journaled engagement in a suitable bearing member 20 having an annular flange 21. A superstructure 24 holds the shaft 10 in an upright position and consists of a sufficient number of lateral brace members 25 to provide firm support for the shaft while it rotates at the high velocities required in practice of the present invention. Each brace member extends radially outwardly of the shaft beyond the outer limits of the rotating elements, to be described, and thence angles downwardly to the foundation 14. The foot 26 of each brace member forms an expanded reinforced base which is secured to the foundation by bolts or the like. The upper end 27 of each brace member is flanged and secured to the flange 21 of the bearing member 20 by bolts or the like.

A wheel 28 is mounted concentrically on the shaft 10 for support of honey extraction supers 31, to be described. The wheel has a hub 32 which is secured integrally to the shaft in any suitable manner, as by means of a collar 32 splined onto the shaft. Although any practicable positioning of the wheel on the shaft is appropriate, to conserve space, the hub is conveniently shaped to fit over the top of the pedestal 11 in cupped relationship therewith. The pedestal and hub are machined to provide suitable matching bearing surfaces, not shown, to allow rotation of the hub with a minimum of friction. The hub includes an annular flange 34. The felly of the wheel, which comprises the main support member for the supers, consists of an annular ring 35. The body of the wheel may have any suitable structure; however, it is preferred to utilize spokes 38 for this purpose. The spokes are each secured at their outer ends 39 to the ring, preferably by welding. Their inner ends 40 are flanged and secured to the hub flange 34 by means of bolts or the like. A perforated ear 41 is welded to the ring adjacently of each spoke.

A second wheel 42 of larger diameter than the super-support wheel 28 is mounted on the shaft 10 above the super-support wheel. The second wheel serves to support containers 45, to be described, for centrifugally separating honey from mulched honeycomb cappings and is substantially similar in construction, having a hub, spokes, and a ring or container-support member. The hub is preferably splined to the shaft and is constrained from axial movement thereon by suitable bolts, keys, or the like, not shown. A perforated ear 49 is welded to the hub above each spoke 38. A collar 52 is splined onto the shaft beneath the bearing member 20 and is suitably constrained from axial movement thereon by means of a key or the like, not shown. A perforated ear 53 is welded to the collar above each spoke 47. In addition, a perforated ear 54 is welded to the ring 48 adjacently of each spoke. Bracing stays 55 consisting preferably of cables or rods are secured between the respective pairs of ears 41, 49, 53 and 54 to provide additional support for the respective wheels 28 and 42.

A belt pulley 56 is splined to the top end 19 of the shaft 10. A suitable electric motor 59 is bolted to a bracket 60 which is secured to one of the brace members by welding or the like. A belt pulley 61 is secured to the drive shaft of the motor, not shown, and is disposed adjacent to the belt pulley 56. Suitable belts 62 connect the two pulleys in driving relationship. The motor is driven by electric power supplied through conductors 63 leading from a suitable source, not shown.

The power of the motor 59 should be sufficient to generate centrifugal forces in the centrifuge which cause honey to separate and discharge freely from the honey extraction supers 31 and mulched cappings, not shown, as will be described. For a radius of approximately sixty-four (64) inches from the axis 12 to the center line of the super-support ring 35, when the super-support wheel 28 is rotated at a velocity of approximately two hundred (200) to two hundred twenty-five (225) revolutions per minute, the honey is subjected to centrifugal forces of approximately eighty (80) times the force of gravity.

Such forces have proven effective for the purpose of the present invention.

Although in the described embodiment the wheels 28 and 42 rotate integrally with the shaft 10, it is possible to utilize other structural associations of the respective wheels with the shaft, such as by mounting the wheels for independent rotation on the shaft. While it may be apparent that the apparatus superstructure 24 and the wheels 28 and 42 may be constructed of a variety of materials, the applicant prefers to use tubular steel members, according to the convenience of assembly, the loads to be borne and the centrifugal forces to be generated. Adequate provision may be made if desired for convenient lubrication of the various bearing and journal surfaces.

*Supports for honey-extraction supers*

The general structure of a honey-extraction super is well known in the art. A type of super adapted to be used in the present embodiment is shown at 31. It consists of a wooden box-like frame 67 open at both top 68 and bottom 69. A plurality of honeycomb frames 70 are mounted within the box in substantially parallel spaced relation, with the respective parallel spaces providing passageways 73 through the box from top to bottom. Each frame supports a thin, panel-like honeycomb foundation 74, preferably of a firm, plastic material. During honey production, bees build honeycombs 75 on opposite sides of each foundation and store honey therein. The honeycombs form a plurality of individual cells 76 which are sloped uniformly upward from the foundation. This slope proves advantageous in the practice of the present invention, since by placing the supers on the centrifuge upside down, the cells are disposed in a downwardly sloping orientation as shown in FIG. 2 and the honey is caused to flow more readily from the honeycombs when centrifuged in the manner to be described. The caps, not shown, which the bees form over the cells for the sealing of honey therein, are removed from the honeycombs shown in FIG. 6 by means of my above mentioned Machine for Uncapping Honeycombs or any other suitable means prior to mounting the supers in the honey extracting apparatus.

A suitable type of cage providing support for a plurality of honey-extraction supers 31 is shown generally at 77. It includes a rectangular base frame 80 adapted to seat two (2) stacks of supers. The base frame is formed of longitudinal channel members 81 which are held in position by tubular cradle members 82 extending transversely of the frame. The channel members and cradle members are secured together in any suitable manner, preferably by welding, and are spaced to conform to the box frames 67 of the respective supers so as to allow free flow of honey therefrom. The cradle members are angled upwardly through the channel members and extended convergently to the top center of each side of the cage. At the point of convergence 83, the cradle members are held sandwiched together by respective triangular yoke members 84, secured by welding, bolts or the like. The yoke members are adapted to accommodate a pivot pin 87 and are pivotally secured thereby to arms 88, which are in turn welded or bolted to the support ring 35. In the present embodiment, there are twelve (12) such cages disposed about the circumference of the support ring. A spoke 38 is disposed adjacently of each cage.

Auxiliary retaining members 89 are mounted on the cage 77 to limit either endward or upward movement of the supers 31 relative to the cage. The auxiliary members each consist of tubular uprights 90 preferably welded to the base frame 80 and connected across their top ends by a cross piece 91. The cross piece 91A at one end of the cage is at a higher elevation than at the other end so as to allow insertion of the supers thereunder. The auxiliary members are braced by side pieces 94 which are suitably connected to the respective yokes 84 or cradle members 82. One side piece 94A is perforated so as to accommodate a pivot pin 95.

Underneath each stack of supers 31 is a receiving funnel 96 mounted on the bottom of the cage 77 beneath the base frame 80. Each funnel is formed of a suitable sheet metal or the like and has the shape, preferably, of an inverted pyramid. The juxtaposed sides 97A of the receiving funnels may be formed of a single piece of metal which is shaped to fit over the central cradle member 82A and welded thereto. The remaining sides 97 of the funnels are secured in any suitable manner to the respective channel members 81 and end cradle members 82.

Each receiving funnel 96 has a discharge opening 100 and a ball valve 101. A perforated ear 102 is welded to the inside of the funnel. A valve lever 103 is pivotally secured at one end to the ear, while its other end 104 projects outwardly of the funnel through an opening 107 therein. The ball valve is suspended from the lever on a suitable rod 108. An actuating lever 109 is mounted on the pivot pin 95 and has one end 110 pivotally secured to connecting rods 111, which are in turn connected to the projecting ends 104 of the respective valve levers 103. The opposite end 114 of the actuating lever is disposed in contact with the adjacent spoke 38, for displacing the ball valves from the openings when the cage 77 is in a position of rest, as shown in FIG. 2. A coil tension spring 115 is secured at one end to a hook 116 protruding from the central cradle member 82A and at the other end to the pivotal connection of the actuating lever 109 and connecting rods 111. The spring is adapted to urge the valve levers downwardly and the ball valves into seated engagement in their respective discharge openings when centrifugal forces tend to swing the cage away from its position of rest. Although the described valve control system operates automatically it is equally possible to utilize valves which may be electrically or otherwise activatable both during and after centrifuging.

An annular trough 117 is disposed on the foundation 14 beneath the super-support cages 77 and in continuous registry therewith when the cages are in a position of substantially gravitational suspension. The trough preferably is adapted to drain into a central sump 118 for convenient collection of the honey discharged from the supers 31.

*Separation container for honey-impregnated cappings*

A type of separation container suitable for separating honey from honey-impregnated mulched cappings is shown generally at 45. It consists of a box-like frame 121 having an open top 122 and a funneled bottom 123 in the form of an inverted pyramid, although other forms of funnel-type bottoms may be utilized. The bottom has a discharge opening 124 preferably of a circular shape adapted to seat a ball valve 125. The box is held pivotally suspended on a pair of pivot pins 127 which extend respectively through arms 128 secured to the ring 48. In the present embodiment, four (4) such containers are utilized, being mounted in the arrangement shown in FIG. 1.

A perforated ear 129 is welded or bolted to the inside of the container 45. A valve lever 130 is pivotally secured to the ear and projects through an opening 131 in the box frame 121. The ball valve 125 is suspended from the valve lever by means of a valve rod 132 pivotally connected to the lever. An actuating lever 135 is mounted on the outside of the container by means of a pivot pin 136. One end 137 of the lever is connected to the projecting end of the valve lever 130 and the other end 138 is disposed for levering engagement with the adjacent arm 128 when the container is disposed in a substantially upright position. A coil spring 139 is connected between the pivot pin 127 and the projecting end of the valve lever and serves to supplement the action of the actuating lever to insure the automatic displacement of the ball valve from the discharge opening when the container is in a substantially upright position of predominantly gravitational suspension. Other types of valve activation systems are possible, as, for instance an electrical control system.

An annular trough 140 is bolted to the bracing member by means of brackets 142 and extends around the entire periphery of the honey extraction apparatus in continuous registry with the funnel discharge openings 124 of the respective containers 45 when the containers are disposed in a substantially upright position and the ball valves 125 are displaced from their respective discharge openings. Any suitable means may be provided to effect convenient drainage of the trough, such as the provision of a spillway spout 143. The trough preferably is sloped to a sufficient degree to allow free gravitational discharge of honey into the spout so that the discharged honey may be conveniently collected in suitable containers, not shown.

A supply funnel 144 is mounted by means of bolted brackets 145 on the overhead portion of one of the brace members 25. The supply funnel is adapted to receive honey-impregnated mulched cappings and to discharge the same through a downwardly disposed passageway 146. An annular trough 149 is mounted on the spokes 47 of the container-support wheel 42 preferably by means of welded brackets 150 and other reinforcing members as required, not shown. The trough 149 is disposed in continuous registry with the funnel discharge passageway during rotation of the centrifuge. Radially inwardly of each separtion container 45 is mounted a mulched-cappings conveying tube 151, having one end 152 connected to the trough and the other end 153 connected to the ring 48 adjacently of the container. The tube is disposed so that when the centrifuge is rotating and the separation container is caused to swing radially outwardly, the honey-impregnated cappings flowing from the tube immediately enter the container. The trough 149 is preferably sloped to assure the ready passage of mulched cappings therealong and into the tube.

*Operation*

The operation of the described embodiment of the present invention is believed to be readily apparent and is briefly summarized at this point. The honey-extraction supers 31 which have had their honeycombs uncapped are stacked onto the cages 77 with the individual honeycomb cells 76 disposed in a downward direction, as shown in FIG. 6. When a cage is in a position of substantially gravitational suspension, the lever 109 is disposed in contact with the adjacent spoke 31 and, therefore, holds the ball valve 101 suspended above the discharge opening 100. In this position, the honey discharges freely from the supers into the trough 117.

Any honey-impregnated mulched cappings which have been collected during the uncapping process may be fed to the supply funnel 144, through which they pass into the trough 149. It is preferable to delay insertion of the bulk of the honey-impregnated mulchings until the centrifuge is placed in operation, so that the mulchings may be evenly distributed around the circumference of the trough.

As the electric motor 59 is placed in operation the centrifuge, including the wheels 28 and 42, commences to rotate. When the wheels have reached the desired velocity, preferably approximately two hundred (200) to two hundred twenty-five (225) revolutions per minute, the cages 77 and the separation containers 45 are disposed in positions of radially outwardly extended relation as shown in FIG. 2. Centrifugal forces are generated as high as about eighty (80) times the force of gravity and cause the honey to be forcefully discharged from the respective supers 31 into the receiving funnels 96. At the same time, the liquid honey mixed with the mulched cappings, being heavier than the cappings, is forced into the radially outward portions of the respective separation containers, while the cappings are displaced radially inwardly.

After a sufficient period of time in which all the honey is allowed to discharge from the supers 31 and complete separation is achieved in the separation containers 45, the electric motor 59 is turned off to allow the centrifuge gradually to cease rotation. As the respective cages 77 and containers gradually assume a position of gravitational suspension from their respective support rings 35 and 48, the actuating levers 109 and 135 eventually come into contact with the spokes 38 or the support arms 128 respectively, and displace the ball valves 101 and 125 from the respective discharge openings 100 and 124. At this time the honey collected in the receiving funnels 96 of the super-support cages and in the bottoms 123 of the separation containers pour into the respective collection troughs 117 and 140. Due to the sloping of the troughs the honey gravitationally proceeds to the sump 118 and to the spillway spout 43, respectively. The supers 31 are then removed from the cages and replaced with additional honey-filled supers. The honeycomb remnants are removed from the separation containers so that the containers may be subsequently used for a fresh batch of honey-impregnated cappings.

While the centrifuge is rotating, cappings placed in the supply funnel 144 are gravitationally distributed around the trough 149 and are then caused to flow through the tubes 151 due to the substantial centrifugal forces developed. Due to the radially outward disposition of the separation containers 45 their open tops 122 are disposed in facing relation to the end of the respective tubes and, consequently, the honey-impregnated cappings freely enter the separation containers for separation in the manner described.

From the foregoing, it is readily apparent that a honey extracting apparatus has been provided which subjects respective quantities of uncapped honey-impregnated honeycombs and honeycomb cappings to centrifugal forces many times the force of gravity and which thereby separates the honey from the honeycombs and cappings. Further, the apparatus prevents waste of honey, by efficiently and economically collecting the separated honey for subsequent use as desired. The apparatus is equipped with valves which operate automatically and effectively control the receipt and collection of separated honey both during and after centrifuging.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

1. Apparatus for extracting honey from honey-impregnated honeycomb formations comprising a centrifuge adapted to be rotated about a substantially vertical axis, said centrifuge including support means spaced radially outwardly of said axis, said support means being adapted to rotate integrally with the centrifuge; means for rotating the centrifuge at a selected velocity; a frame adapted to contain honeycomb formations and to allow honey to flow from the formations outwardly of the frame; means mounting said frame on the support means for pivotal movement between a first position in which the frame is substantially gravitationally suspended from the support means and a second position in which the frame during rotation of the centrifuge is extended substantially centrifugally radially substantially outwardly of the support means; a funnel-shaped receiver mounted on said frame to receive honey flowing therefrom and having an opening adapted to pass honey; valve means connected to said frame for closing said opening when the frame is in the second position and opening said opening automatically when the frame is in the first position; and a collector disposed beneath the first position for collecting honey passing through said opening.

2. The apparatus of claim 1 wherein the valve means comprises a closure member; a lever having a pivot point and first and second ends respectively; means mounting said lever on the frame for pivotal movement about the pivot point so that the first end is engaged with the support means when the frame is in the first position and is disengaged therefrom when the frame is in the second position, said second end being displaced away from the opening when the first end is engaged with the support means; and means connecting the closure member to said second end and adapted to cooperate with the lever to allow said closure member centrifugally to seat in the opening when the frame is in the second position and to displace said closure member from the opening when the frame is in the first position.

3. The apparatus of claim 2 including centrifuge brace means disposed above the support means in stationary relation thereto; a supply funnel mounted on the brace means radially inwardly of the honeycomb-formations frame and thereabove, said supply funnel providing an opening; an annular receiving tray mounted on the support means beneath the supply-funnel opening and in continuous registry therewith; and elongated conveyor means connected to said tray and extending to the frame, said conveyor means upon rotation of the centrifuge being adapted centrifugally to receive honey-impregnated honeycomb formations from the tray and centrifugally to discharge said formations into said frame.

4. An apparatus for extracting honey from honey extraction supers containing uncapped honeycomb layers disposed in spaced substantially parallel relation comprising an elongated shaft; means mounting said shaft in a substantially vertical orientation, said mounting means including brace members extending radially of the shaft; an annular super-support member disposed beneath the brace members; an annular collar disposed on said shaft in concentric relation therewith; a plurality of braced spokes connecting said member to the collar in concentric relation with the shaft for rotation about a substantially vertical axis; means rotating the support member at a predetermined velocity to generate selected centrifugal forces; a cage adapted to seat a plurality of supers in secured engagement thereon, said cage having a bottom portion adapted to pass honey flowing from the supers; means connecting said cage to the annular super-support member adjacently of a spoke for pivotal movement about an axis tangential to a circle concentric to the shaft between a first position in which the cage is suspended substantially gravitationally from the support member and a second position during rotation of the shaft in which the cage is extended substantially centrifugally radially outwardly of the support member; a funnel-shaped member connected to the bottom of the cage for receiving honey flowing from the supers and having an opening adapted to pass said honey, a closure member adapted to close said opening; means mounting said closure member within the funnel-shaped member for selective movement between a first position in which the closure member is displaced from the opening and a second position in which said closure member is seated in honey-sealing relation in the opening; lever means mounted on the cage for pivotal movement, said lever means having an end adapted to engage the adjacent spoke when the cage is disposed in its first position, said lever means being adapted to move the closure member to its first position in response to said spoke engagement, said lever means being adapted to release the closure member from its first position when the cage moves to its second position during rotation of the super-support member thereby allowing centrifugal forces to move said closure member to its second position; and annular trough means disposed beneath the first position of the cage to collect honey passing through the opening of the funnel-shaped member.

5. The apparatus of claim 4 wherein the brace members extend downwardly radially outwardly of the cage and including a second annular support member diametrically larger than the super-support member; a second annular collar disposed on the shaft above the super-support member, below the brace members and in concentric relation with said shaft; braced spokes connecting said second member to the second collar radially inwardly of the downward extent of the brace members, said second support member being disposed in concentric relation with the super-support member; a container adapted to contain honeycomb formations comprising honey-impregnated mulched cappings, said container having a funnel-shaped bottom portion, said bottom portion providing an openings adapted to pass honey; means mounting the container on the second annular support member adjacently of a spoke for pivotal movement substantially similar to that of the super cage; a closure member operable to open the container bottom-portion opening substantially similarly to the operation of the cage-funnel closure member, said container during rotation of the shaft being adapted centrifugally to receive honey into its bottom portion, said honey having been centrifugally separated from the cappings; a supply funnel mounted on a brace member radially inwardly of the container and providing an opening; an annular receiving tray mounted on the spokes and disposed beneath the supply funnel opening in continuous registry therewith; elongated conveyor means connected to said tray and extending to the container, said conveyor means upon rotation of the second support member being adapted centrifugally to receive honey-impregnated mulched cappings from the tray and centrifugally to discharge said cappings into said container; and annular trough means mounted on the brace members where extended downwardly, said trough means being disposed beneath the first position of the container to collect honey passing through the container bottom-portion opening.

References Cited

UNITED STATES PATENTS

| | | | |
|---|---|---|---|
| 742,759 | 10/1903 | Valerius | 233—26 |
| 1,390,898 | 9/1921 | Fraser | 233—20 |
| 3,011,646 | 12/1961 | Boronkay | 210—361 |

FOREIGN PATENTS

| | | |
|---|---|---|
| 7,389 | 9/1879 | Germany. |
| 78,074 | 11/1894 | Germany. |

M. GARY NELSON, *Primary Examiner.*

H. T. KLINKSIEK, *Examiner.*